(No Model.)
W. H. TRAPHAGEN.
CULTIVATOR SHOVEL.
No. 581,967. Patented May 4, 1897.
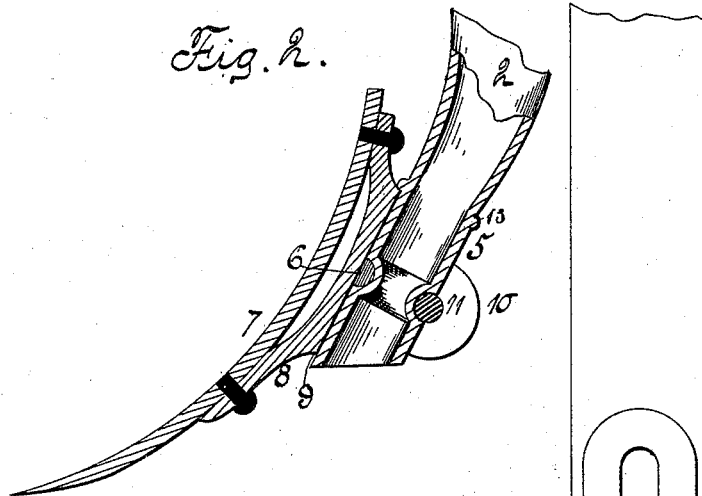
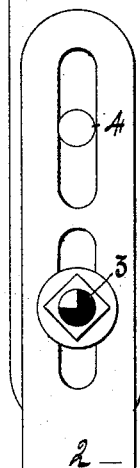
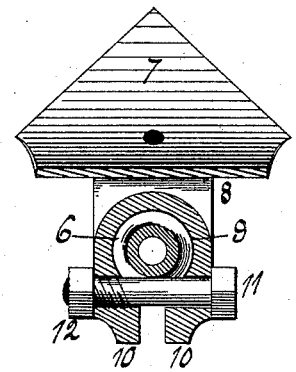
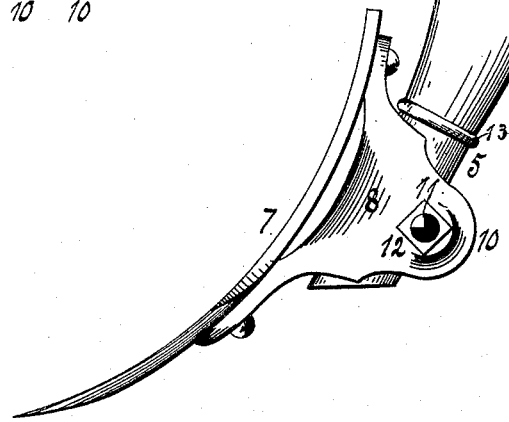
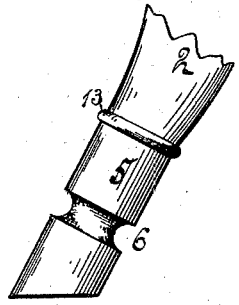
Witnesses:
B. Blinn
E. Behel
Inventor:
William H. Traphagen
By A. O. Behel
Atty.

UNITED STATES PATENT OFFICE.

WILLIAM H. TRAPHAGEN, OF ROCKFORD, ILLINOIS, ASSIGNOR TO EMERSON, TALCOTT & CO., OF SAME PLACE.

CULTIVATOR-SHOVEL.

SPECIFICATION forming part of Letters Patent No. 581,967, dated May 4, 1897.

Application filed March 11, 1896. Serial No. 582,761. (No model.)

*To all whom it may concern:*

Be it known that I, WILLIAM H. TRAPHAGEN, a citizen of the United States, residing at Rockford, in the county of Winnebago and State of Illinois, have invented certain new and useful Improvements in Cultivator-Shovels, of which the following is a specification.

The object of this invention is to form a connection between a cultivator-shovel and its support, so that the shovel will not become disengaged even if it should become loosened, and which permits of the shovel being adjusted toward or from the plants.

In the accompanying drawings, Figure 1 is a side elevation of a cultivator-standard, a cultivator-shovel and its support connecting it with the standard. Fig. 2 is a vertical central section through the cultivator-shovel and its support. Fig. 3 is a transverse section through the shovel and support at the point of connection. Fig. 4 is a side elevation of the lower end of the shovel-support.

To the shovel-standard 1 is connected a shovel-support 2, in this instance by a pivot-bolt 3 and break-pin 4. The lower end 5 of the support is in cylindrical form and provided with an annular groove or depression 6.

To the shovel 7 is secured a bracket 8, having a central opening 9 and two perforated ears 10. The circular lower end of the support is placed within the central opening 9 of the bracket. A bolt 11 is passed through the perforation of the ears 10 and located in the annular groove 6 of the support, receiving a nut 12 on its end. This bolt, located in the groove of the support, forms a connection between the support and shovel and the shovel is free to be turned toward or from the plant as may be required, and when properly adjusted the ears are clamped around the shank of the support by turning up the nut 12 until the parts are securely clamped together. Should the nut 12 become loose, the shovel would still be held in connection with its support, as the bolt 11 must be withdrawn before a disengagement can take place.

A ring 13 reinforces the lower end of the shovel-standard.

I claim as my invention—

In a cultivator, the combination of a shovel-standard having a semicircular recess near its lower end, a shovel having a bracket secured to its rear face provided with a vertical cylindrical opening terminating in two perforated ears, and a bolt passed through the ears and located in the semicircular recess at the rear face of the shovel-standard.

WILLIAM H. TRAPHAGEN.

Witnesses:
   H. R. TRAPHAGEN,
   A. O. BEHEL.